United States Patent Office 3,698,998
Patented Oct. 17, 1972

3,698,998
PROCESS FOR CULTIVATING MICRO-ORGANISMS IN THE PRESENCE OF HYDROCARBONS
René Avrillon, Maisons-Lafitte, Sigismond Franckowlak, Montesson, Claude Gatellier, Boulogne, and Georges Glikmans, Meudon-la-Foret, France, assignors to Institut Francais du Petrole des Carburants et Lubrifiants, Rueil-Malmaison, France
No Drawing. Filed May 13, 1969, Ser. No. 824,256
Claims priority, application France, May 15, 1968, 151,959
Int. Cl. A23j 1/18; C12c 11/08
U.S. Cl. 195—28
11 Claims

ABSTRACT OF THE DISCLOSURE

In the cultivation of micro-organisms, a liquid hydrocarbon feedstock is employed containing at least 70% by weight of linear paraffinic hydrocarbons. The growing step is conducted in the presence of a gas-containing molecular oxygen and with a nutrient aqueous medium containing: (a) assimilable nitrogen and phosphorus; (b) oligoelements such as trace amounts of copper, cobalt, iron, molybdenum and manganese compounds; (c) growth factors such as yeast, etc.; and (d) essential mineral elements such as potassium, ammonium and magnesium ions. The micro-organisms are then recovered from at least the major part of unconverted hydrocarbons, preferably by decantation, and then subjected to a maturation step in an aqueous medium similar to the nutritive aqueous medium, but deprived of at least one of the essential mineral elements.

---

The culture of micro-organisms in the presence of hydrocarbons from petroleum fractions is not new. Such a process has been described in various publications, e.g. Just, Schnabel, and Ullmann, "Submerged Culture of Yeasts and Bacteria on Hydrocarbons" published in "Die Brauerei Wissenschaftliche Beilage," No. 8, August 1951. In the latter article, the authors describe how they succeeded in growing yeast and bacteria on different hydrocarbons in the presence of aqueous nutrient media and oxygen.

The present invention consists of an industrial process of cultivating yeasts, moulds and bacteria on hydrocarbon substrates. This process offers, as compared with the process described by the above authors or with respect to the various other suggested industrial scale processes of microbiologically cultivating proteins, numerous advantages such as, in particular:

The production of proteins of a much higher purity, easily digestible and of advantageous use in the preparation of a composite food for cattle and optionally for humans;

Lower manufacturing costs as a result of a higher yield in proteins, a simplification of the different steps of the process and a reduction in the number of said steps.

Thus, as it will be described more in detail in the following specification, the step of separating the products by centrifugation will be replaced, if so desired, by a sedimentation step, the number of steps of washing the micro-organisms can be reduced, and the steps of treatment by solvents can be omitted or simplified.

Another object of the invention is to provide an industrial process whereby there can be simultaneously achieved, with high yields and low costs, both an excellent dewaxing of the petroleum cuts and the production of micro-organisms convenient for use as a source of protides and vitamins for alimentation.

The invention relates to an improved process of cultivating micro-organisms, consisting of contacting in the presence of a gas containing molecular oxygen, a strain of micro-organisms with a liquid hydrocarbon feedstock containing at least 70% by weight of linear paraffinic hydrocarbons and with a nutrient aqueous phase containing at least:

(a) A nitrogen source and a source of assimilable phosphorus (b) oligoelements (c) growth factors and (d) essential mineral elements, thereafter recovering the micro-organisms free from the major part of unconverted hydrocarbons, which however still contain a minor part of hydrocarbons, and contacting the so-recovered micro-organisms with a non-nutritive aqueous phase containing at least the compounds (a) but deprived of at least one of the compounds (b), (c) and (d).

In a preferred way of operation the following successive steps, as defined herebelow, are used (some steps being optionally omitted as further indicated in the specification):

(1) Preparation of a liquid hydrocarbon feedstock containing at least 70% and preferably at least 85% by weight of one or more normal paraffinic (or linear) hydrocarbons, i.e. unbranched hydrocarbons.

(2) Growth of the micro-organisms by contacting the same simultaneously with (a) a hydrocarbon feedstock such as obtained in step (1), (b) an aqueous nutrient medium and (c) oxygen, said step being called a fermentation step.

(3) Separation of the micro-organisms from the nutrient aqueous medium and according to the case, from unconverted hydrocarbon(s).

(4) Contacting of the micro-organisms obtained from the preceding step, with oxygen and a non-nutritive aqueous medium as hereinafter defined, said step being called a maturation step.

(5) Separation of the micro-organisms from the non-nutritive aqueous medium.

(6) Washing of the micro-organisms in one or more steps.

(7) Drying of the micro-organisms.

The first step consists of dewaxing a starting hydrocarbon cut so as to obtain an effluent containing at least 70% and preferably at least 85% by weight of normal (linear) paraffins.

The effluent will, for instance, contain about from 75 to 95% by weight of normal paraffins. However the normal paraffin content will generally not exceed 99%. As a matter of fact a content of more than 95% and specially more than 99%, although not being a bar to the carrying out of steps (2–7), results in a significant cost increase of the first step which will have a substantial effect on the overall cost of the process.

This starting hydrocarbon cut is generally a cut of the kerosene type, an oily cut or preferably a gas oil cut. The dewaxing of this starting cut will be carried out preferably according to the process described in the French Pat. 1,463,784. This process consists of contacting a hydrocarbon cut with urea in suspension or dissolved in a mixture of nitrile, monocarboxylic acid and water. There is formed a solid complex of urea with normal paraffins, said complex being separated from the residual hydrocarbon and from the major part of the water-nitrile mixture in one or more separating units, in most cases centrifugation devices, preferably of the cyclone type, said complexes being afterwards destroyed by heat so as to recover the desired normal paraffins.

It is critical to obtain the above-mentioned n-paraffins contents at the end of the first step since a feedstock containing less than 70% of n-paraffins cannot be treated beneficially according to the process of the invention; in particular the fourth step (maturation) does not produce the desired result as shown hereinafter more in detail.

In accordance with the amount of urea brought in contact with the starting hydrocarbon cut, the dewaxing of the latter will be more or less complete; as the complexing of the normal paraffins is always preferential towards the heaviest ones, the decrease of the freezing temperature of the treated cut is always maximum and corresponds to a minimum amount of normal paraffins withdrawn. Otherwise stated, the hydrocarbon cut (for instance gas oil) will be dewaxed with a maximum yield.

Concomitantly the yield of proteins will also be a maximum, in opposition to the prior art processes.

Obviously when the starting hydrocarbon cut already contains n-paraffins in a proportion of 70% or more, the first step becomes unnecessary.

The second step, hereinafter called growth of fermentation step, consists of contacting the micro-organisms, the growth and multiplication of which is desired, with the paraffinic hydrocarbon feedstock, oxygen and a nutrient aqueous medium.

The most intimate contact possible is carried out between the three phases, i.e. the micro-organisms, the hydrocarbon phase and the aqueous phase. In most cases a good dispersion of these various elements is achieved by injecting a gas containing molecular oxygen through a gas distributor.

For carrying out this step, there can be used any apparatus favouring the contact between said three phases, for instance such an apparatus as described in the French Pat. 1,529,536 or, preferably in the French patent application No. 177,774, filed by the applicant of the present specification on Dec. 11, 1968. This latter application discloses an industrial apparatus whereby there is achieved, in particular, an intimate contact between several immiscible liquid phases, a gaseous phase and a solid phase (yeasts for instance).

In the second step, the operating conditions are preferably as follows:

A temperature between 20 and 40° C. and more preferably between 27 and 33° C.;

A pH value lower than 7 and more particularly between 3 and 5. Being given that the medium naturally tends to become more acid during the growth of the micro-organisms, it is particularly convenient to maintain the pH at the optimum value, for instance by periodic injections of alkaline solutions (for example ammonia). The progressive decrease in the pH value during the fermentation step will occur when the aqueous medium contains consumable ammonium ions, as elucidated hereinafter;

A continuous injection of the aqueous nutrient medium, the hydrocarbon(s) containing normal paraffins, and the gas containing molecular oxygen.

Preferably the growth rate of the micro-organisms is controlled by introducing the hydrocarbon in an amount slightly lower than that corresponding to the optimum growth rate of the micro-organisms.

The nutrient medium will contain essentially:

(1) Sources of nitrogen and assimilable phosphorus, for instance in the form of $NH_4^+$ or $PO_4^{---}$, nitrates or urea;

(2) Oligoelements, for instance iron or copper compounds, generally in trace amounts;

(3) Growth factors of the B-vitamin type obtained for instance in the form of yeast extract; and (4) Essential mineral elements for growth and multiplication, for example in the form of ions whose nature depends on the strain of cultivated micro-organisms.

In the case of a strain of yeasts of the Candida type for instance, the nutrient medium will contain at least potassium, sulfur, for instance in the form of sulfate ions, and magnesium.

Generally the content of nitrogenous compound (for example ammonium sulfate) of the aqueous medium is between 0.1 and 60 grams of nitrogenous compound per liter, preferably between 1 and 20 g. per liter, these values being however not limitative.

Preferably there will be introduced phosphorus in the nutrient medium, in the form of ammonium phosphate. Potassium phosphate and sodium phosphate could be used as well, these being not limitative. The amount of phosphorus compound may be for example between 0.5 and 20 g. per liter.

It must be specified that the micro-organisms which can be used according to the invention consist of yeasts, bacteria and moulds or mixtures thereof. By way of non-limitative examples of these three categories of micro-organisms are to be mentioned.

(a) Amongst the yeasts: the family of Endomycetaceae and more particularly the sub-family of Saccharomycetoideae to which pertain the genera Pichia, Hansenula, Debaryomyces, the sub-family of Lipomycetoideae and particularly the Lipomyces genus; the family of Cryptococcaceae, more particularly the sub-family of Cryptococcoideae comprising Torulopsis and Candida genera and the sub-family of Rhodotoruloideae comprising the Rhodotorula genus.

(b) Amongst the bacteria: the order of Pseudomonadales, particularly the Pseudomonadaceae comprising the Pseudomonas genus including the following species: *Pseudomonas fluorescens, Pseudomonas ovalis, Pseudomonas cruciviae;* the order of Eubacteriales comprising the Achromobacteraceae family and particularly the Achromobacter genus, the Flavobacterium genus including the species of *Flavobacterium aquatile, Flavobacterium lutescens, Flavobacterium marinum;* the Micrococcaceae family, particularly the species *Micrococcus luteus* and *Micrococcus flavus,* the Brevibacteriaceae family including the Brevibacterium genus; the order of Actinomycetales including the Mycobacteriaceae and the Actinomycetaceae families.

(c) Amongst the moulds: the Mucoracees family including the Rhizopus genus; the Aspergillales family including the Aspergillus and Penicillium genera.

The third step of the process according to the invention consists of separating the micro-organisms from the nutrient aqueous medium as well as, according to the case, from the unconverted hydrocarbon phase during the second step; the purpose of this procedure is to obtain the micro-organisms associated with the lowest possible amount of aqueous phase and especially of hydrocarbons.

This separation can be achieved in any known manner. One of the advantages of the process is that the separation step can be carried out only by mere decantation of the culture medium which was not achievable according to the prior art processes.

(Up to now, in fact, this separation step was carried out in expensive centrifuges.)

The decantation according to the invention results in the separation of at least two and sometimes three phases which are listed below, arranged in the order of increasing specific gravities:

(a) A phase consisting essentially of hydrocarbons; this phase may be absent in the case where all the hydrocarbons have been converted;

(b) A phase consisting essentially of water containing unconsumed nutritive salts;

(c) A "cream" of micro-organisms at the lower part of the decantation vessel.

There may be obtained in some instances, only two phases, i.e. the heavy yeasts, "cream" (c) and a mixed phase (b) consisting of an emulsion between water and the hydrocarbon(s).

In any case, irrespective of the formation of two or three phases, the natural sedimentation results in a sharp separation of the yeast cream from the rest of the growth medium.

It is therefore sufficient to withdraw this cream of micro-organisms and to forward it to the following step of the process.

It has been surprisingly observed that sedimentation was possible only when the hydrocarbon feedstock contacted with the micro-organisms during the second step contained at least 70% by weight of normal paraffins. Below this content, although the micro-organisms can still grow, there is obtained an emulsion containing non-metabolizable hydrocarbons, the micro-organisms and the aqueous phase from which it is no longer possible to separate the components by mere decantation. It is thus necessary in such a case to use centrifugation and frequently to make use in addition of surface-active agents which facilitate the separation.

It is obvious that, if so desired, the third step of the process can be carried out with the use of centrifugation or filtration or a combination of two or more separation techniques.

At the end of this third step according to the invention, there are recovered micro-organisms still containing hydrocarbons adsorbed on the walls of the cells. These adsorbed hydrocarbons consist essentially of metabolizable compounds (i.e. normal paraffins) due to the particular composition of the feedstock used during the fermentation step.

This cream of micro-organisms is contacted, during the fourth step of the process (maturation) with oxygen and with a non-nutritive aqueous phase containing at least one source of nitrogen and at least one source of phosphorus, both assimilable by the micro-organisms.

This non-nutritive aqueous phase may contain other elements than those previously mentioned under numerals (2) and (4) in the disclosure of the nutritive medium in the second step.

However the non-nutritive aqueous phase of the maturation step will be deprived of at least one of the types of compounds selected amongst the growth factors, the oligo-elements and the essential mineral salts such as, for instance $K^+$, $Mg^{++}$.

Any known source of nitrogen which is soluble and assimilable by the micro-organisms can be used. Such a source preferably consists of soluble ammonium salts, for example an ammonium sulfate, nitrate, acetate, citrate or phosphate. There may however be used other sources such as urea or nitrates of various metals.

The nitrogenous compound (for instance ammonium sulfate) content of the aqueous solution usually corresponds to between 0.1 and 60 grams of nitrogenous compounds per liter, preferably between 1 and 20 g., for instance 5 g. per liter, these values being however not limitative.

Any known source of phosphorus, soluble and assimilable by the micro-organisms, can be used, for instance a water-soluble salt of phosphoric acid. Ammonium phosphates will be preferred, in particular ammonium acid phosphates. Also to be mentioned are Na, K or magnesium phosphates.

The phosphorus content, expressed as $PO_4^{3-}$, is usually between 0.5 and 20 g./liter of aqueous solution.

A preferred way of carrying out the fourth step consists of using as phosphorus source a mixture of monoacid and diacid phosphates.

It is essential to make use of different types aqueous media for the second and the fourth steps.

In the first case (that of the second stage which corresponds to the stage of growth and multiplication of the micro-organisms), the aqueous medium is a nutrient medium not only containing a nitrogen source and a phosphorus source but also other essential elements as heretofore stated.

The non-nutritive medium of the fourth step is deprived of at least one of the essential elements from categories (2) to (4), i.e. oligoelements, growth factors and essential mineral elements.

Preferably the non-nutritive medium used for the maturation is deprived of at least one of the compounds of the fourth category, for example of magnesium.

During this fourth step, called the maturation step, the micro-organisms are no longer multiplied. They oxidize and convert at first the hydrocarbon(s) still adsorbed on the walls of their cells and thereafter convert the lipides and fatty substances both external (adsorbed) or internal to their cells.

The maturation step according to the invention therefore results in a decrease of the lipide and fatty substance content both of the extra- or intra-cellular type (generally up to a substantially complete consumption of the lipides) and also in an increase of the protide content of said micro-organisms are deprived of both the hydrocarbon from the consumption of the lipides but also in their conversion, at least partially, to protides).

It has been observed, surprisingly that the maturation according to the invention was only possible when the micro-organisms are deprived of both the hydrocarbon substrate (with the exception of the small amounts originally adsorbed on the cell walls) and at least one of the essential compounds from categories (2) to (4) as above stated.

By way of comparison, when the micro-organisms are contacted with oxygen and a complete nutrient aqueous medium such as, for instance, that used during the second step, there is observed even in the absence of a hydrocarbon source, a certain decrease of the adsorbed hydrocarbons but, in every case, no decrease of the internal lipides is to be observed.

In addition, the maturation stage according to the invention, is only possible when the hydrocarbon feedstock used as substrate for the second step actually contains the above stated minimum n-paraffin percentage.

As a matter of fact, when there is used as feedstock for the second step, a hydrocarbon cut containing, for instance, 15% of normal paraffins, there is observed by experience that the maturation stage according to the invention is no longer possible, even in the presence of a non-nutritive aqueous medium (for instance containing only $(NH_4)_3PO_4$) and the absence, of course, of newly added hydrocarbons.

In this case, there is observed, in fact, a more or less substantial decrease of the hydrocarbons adsorbed on the cell walls, but without either an actual increase of the protide content of the micro-organisms or a substantial decrease of their internal lipide content. On the contrary, there would be rather observed an increase of said lipide content, probably as a result of the oxidation of iso-paraffins adsorbed on the cell walls.

Moreover, the aqueous medium used during the maturation step must necessarily contain a source of assimilable phosphorus.

Otherwise, for instance, when the aqueous medium consists of pure water or water only containing for example, potassium phosphate (and accordingly free from nitrogen), not only the growth (i.e. the multiplication) of the micro-organisms is stopped but also the mechanisms of intra-cellular conversion are also stopped and, of course, the lipide and protide contents of the cells no longer vary.

The contact time, within the maturation vessel, between the micro-organisms cells, the aqueous non-nutritive medium and air, depends on numerous factors, particularly the temperature and the strain of micro-organisms.

Commonly this contact time will be at least 30 minutes and for example between 1 and 20 hours, preferably between 2 and 10 hours.

It is thus appreciated how critical are the conditions required for carrying out the maturation when the maximum of the advantages according to the invention are to be obtained.

The following description of the final steps of the process will also show the interaction of the different steps and particularly the influence of the maturation on the final steps.

The fifth step of the process consists of separating the micro-organisms from the non-nutritive aqueous medium. This separation can be achieved by any usual method, for instance decantation, filtration and/or centrifugation.

There is carried out, during the sixth step one or more washings of the micro-organisms by saline aqueous solutions and/or substantially pure water. If so desired, a surface-active agent may be added during this washing operation although it is generally not necessary.

A variant consists of replacing the water washing step by one or more solvent washing steps or terminating the washing operations therewith. This washing with solvent provides for the removal of the last traces of hydrocarbons and/or lipides adsorbed by the micro-organisms. On the other hand, these two types of compounds having substantially disappeared during the maturation step, this treatment with solvent is usually unnecessary (in opposition to the already known processes).

Nevertheless, when it is desired to obtain micro-organisms with a still higher purity in proteins, a further treatment with solvent will be advantageously effected but this treatment will require substantially reduced solvent amounts and contact times as compared to those of the conventional processes.

There will be used known solvents for the extraction of this type of compounds, for example either a polar solvent such as an alcohol, usually of low molecular weight, for instance ethanol, propanol, isopropanol, or a hydrocarbon compound, saturated or unsaturated, such as hexane, octane, benzene, or both types of solvents successively or simultaneously in the form of a mixture thereof.

The micro-organisms are dried during the seventh or last step which can be effected according to any known method, for instance by atomization. In this case at least a part of the membranes of the micro-organisms are broken.

When the micro-organisms are yeasts they can be used advantageously, as obtained at the end of the seventh step, as a protein feed source, particularly for the cattle.

In this case they will be advantageously admixed with other compounds such as cereals and fatty substances so as to obtain a composite complete food.

As a variant of the seven-step process as hereabove described, and in order to obtain micro-organisms and more particularly yeasts of high purity which can be used optionally as human food, a supplemental intermediate step can be added.

This supplemental step will be preferably carried out after the washing of the micro-organisms (i.e. after the sixth step as above described, usually before the treatment with solvent, if any). It will consist of subjecting the micro-organisms to such conditions that their cells be broken. This bursting of the cells may be achieved for instance by autolysis, hydrolysis or plasmolysis of said cells.

The autolysis consists in a degradation of the micro-organisms by the enzymes contained therein or added thereto. The autolysis usually takes place at a temperature of about 30–60° C.

In the case of hydrolysis, the degradation of the cells results from the action of acids or alkaline bases; as to plasmolysis, it consists in having the proteins of the cytoplasm diffused through the cells walls as a result of a change in the osmotic pressure.

Autolysis, hydrolysis or plasmolysis thus favour a more complete subsequent action of the solvent(s) as carried out in the variant of the sixth step.

The following step of the process (drying) is substantially unchanged with respect to what has been previously stated.

Another variant of the process consists of subjecting the micro-organisms, as directly recovered from the fifth step, to such a thermal drying that the cell walls be broken.

The process is then terminated with a treatment by means of a solvent, preferably one (or more) chlorinated solvent such as chloroform, dichloroethane, dichloropropane, a methanol-chloroform mixture, and with a final drying step.

Of course, in this case, the sixth and seventh steps of the general process are omitted.

The following non-limitative Examples 1 to 3 illustrate the invention. Examples 1A and 1B are given for sake of comparison and form no part of the invention.

EXAMPLE 1

There are contacted at 20° C. a gas-oil containing 11% by weight of linear paraffinic hydrocarbons with a mixture of urea, acetonitrile and water, according to the process described in the French Pat. No. 1,463,784.

This results in the formation of a preferential complex of linear paraffins with urea; said complex is separated from the remaining hydrocarbons in a series of hydrocyclones.

The complex is then decomposed by heating at 70° C. There are thus recovered a hydrocarbon phase containing 89% by weight of linear paraffins (the complement to 100% consisting essentially of iso-paraffins) and, naturally, urea.

This hydrocarbon phase is then contacted, in a fermentation vessel at 30° C., with an inoculum of *Candida lipolytica*, preliminarily cultivated on hydrocarbons, in the presence of an aqueous nutritive medium of the following composition, and in the presence of air in a divided form.

The composition of the nutritive aqueous medium is as follows:

|  | G. |
|---|---|
| Ammonium acid phosphate | 2.9 |
| Magnesium sulfate | 0.9 |
| Potassium chloride | 1.32 |
| Yeast extract (growth factor) | 0.03 |
| Spring water (containing oligoelements) | 300 |
| Distilled water | 700 |

The pH value of the medium is maintained at 4 by ammonia injection.

The air flow is such as to form an emulsion of the three phases (hydrocarbon liquid phase, aqueous phase and gaseous phase) providing a good contact between the yeasts and these three phases.

The fermentation vessel is continuously fed with a hydrocarbon substrate containing 89% of linear paraffins, with aqueous nutritive medium and with air while continuously withdrawing a part of the culture medium.

The effluent is conveyed to a decanter where there quickly appear 2 phases:

(1) A mixed phase containing water and hydrocarbons;
(2) A yeast cream at the lower part of the decanter.

The yeast cream is conveyed to a maturation vessel (identical to the fermentation vessel) where it is contacted, in the presence of air, with a non-nutritive aqueous medium composed of:

|  | G. |
|---|---|
| Ammonium acid phosphate | 2.9 |
| Potassium chloride | 1.32 |
| Spring water (oligoelements) | 300 |
| Distilled water | 700 |

The temperature and pH conditions are identical to those prevailing in the fermentation vessel. The respective proportions are of 100 volumes of yeast cream per 16 volumes of aqueous medium.

By microscopic examination of the yeast cells, there is observed, at first, a consumption of the hydrocarbons previously adsorbed during the fermentation step by the cell walls, and subsequently a change in appearance of the cell cytoplasm.

These different phases are confirmed by chemical analysis, the results being given in Table I herebelow.

It must be noted that in this and the following examples, the determinations have been carried out as follows:

Nitrogen determination by the method of Kjeldahl;

Determination of external fatty substances (essentially esters, ketones, fatty acids) and hydrocarbons, by washing 3 times the yeasts with n-hexane at 25° C., evaporating the same and weighing the residue after evaporation;

Total fatty substances are determined by destroying the cells by use of ultrasonic waves, thereafter effecting by means of boiling acetone 3 successive extractions, evaporating acetone and weighing the residue after evaporation.

The internal fatty substances (essentially lipides) are determined by difference between the last two results.

TABLE I

This table gives the composition by weight of the cells, expressed as a function of time. (The complement to 100% of the figures given herebelow corresponds to the protides, including nitrogen, the glucides and the mineral salts.)

| Time in hours | 0 | 2 | 12 |
|---|---|---|---|
| Nitrogen | 6.1 | 6 | 8.5 |
| External fatty substances plus adsorbed hydrocarbons | 0.5 | 0 | 0 |
| Internal lipides | 10.5 | 10.4 | 1 |
| Total of fatty substances | 11.0 | 10.4 | 1 |

It can be appreciated from this table that the cells recovered at the end of the second hour of maturation are free from external fatty substances and adsorbed hydrocarbons; however these cells still contain a substantial amount of internal lipides and it can be observed that, even after 3 washings with water and drying, they easily become rancid during storage.

In contrast thereto, the cells recovered after twelve hours were substantially free from internal and external fatty substances. Moreover their nitrogen (and therefore protides) content was increased.

After 12 hours of maturation, yeasts are recovered by centrifugation.

They are thereafter washed 3 times with ordinary water and dried, they do not become rancid in air under usual storage conditions.

EXAMPLE 1A

Example 1 is repeated with all the steps and operating conditions set forth in this example, with the exception of maturation step during which the aqueous medium used as a nutritive medium is identical to that used during the fermentation step, (also called growth step).

The analysis of the cells during the maturation yielded the following results:

TABLE II

| Time in hours | 0 | 2 | 12 |
|---|---|---|---|
| Nitrogen | 6.1 | 6.1 | 6.1 |
| External fatty substances plus adsorbed hydrocarbons | 0.5 | 0.2 | 0.1 |
| Internal lipides | 10.5 | 10.5 | 10.5 |
| Total fatty substances | 11.0 | 10.7 | 10.6 |

It is thus apparent that the maturation, in the presence of a nutritive medium as heretofore defined, does not provide for the total elimination of the external fatty substances; moreover this maturation is ineffective with respect to the consumption of the internal lipides. It should be observed, moreover, that, during the maturation step, the nitrogen content of the cells remains constant.

EXAMPLE 1B

Example 1 is repeated but for the growing of the yeasts directly on a gas oil substrate having an 11% by weight content of linear paraffins (thus without preliminary concentration of its paraffins).

It is observed that the effluent from the fermentation vessel forms an emulsion from which it is no longer possible to separate the yeasts by mere decantation. It is accordingly necessary to make use of centrifugation in the presence of a surface-active agent.

The so-centrifugated yeast is conveyed to the maturation vessel where it is contacted with the same non-nutritive aqueous medium as that of Example 1 and under the same conditions.

Even after 12 hours, the cells still contain 13.1% of total fatty substances (1% of which in the form of external fatty substances and adsorbed hydrocarbons). The yeasts must be further subjected to 5 successive washings with water followed with 2 washings with a mixture hexane-ethanol before being dried to a product which can be stored without substantial risk of becoming rancid.

EXAMPLE 2

Example 1 is repeated, however with the use of a "gatsch" (i.e. a raw paraffins cut) obtained by dewaxing of a lubricating oil cut, said "gatsch" having a 78% linear paraffin content.

Said gatsch is contacted in the fermentation vessel with the same nutritive aqueous medium as in Example 1, under the same operating conditions.

The effluent from the fermentation vessel separates by sedimentation in two phases, including a cream of yeasts which is withdrawn.

The latter is conveyed to a maturation vessel operated under the same conditions as those of Example 1 (the yeasts being therefore in the presence of a non-nutritive aqueous medium).

At the end of this step the yeasts are substantially free from external and internal fatty substances. After washings with water and drying there are obtained yeasts which do not become rancid during storage.

EXAMPLE 3

Example 1 is repeated except that, during the maturation step, there is used a non-nutritive aqueous medium of the following composition:

| | G. |
|---|---|
| Ammonium acid phosphate | 2.9 |
| Magnesium sulfate | 0.9 |
| Yeast extract | 0.03 |
| Spring water (oligoelements) | 300 |
| Distilled water | 700 |

All other conditions being kept identical to those of Example 1, there are obtained substantially the same results as according to said Example 1.

What we claim as this invention is:

1. An improved process of cultivating micro-organisms comprising the steps of: growing, in the presence of a gas containing molecular oxygen, a strain of micro-organisms with a liquid hydrocarbon feedstock containing at least 70% by weight of linear paraffinic hydrocarbons and with a nutritive aqueous medium containing at least (a) an assimilable nitrogen source and an assimilable phosphorus source, (b) oligoelements, (c) growth factors and (d) essential mineral elements, of recovering the liberated micro-organisms from the major part of any unconverted hydrocarbons, and of contacting the so-recovered micro-organisms with a non-nutritive aqueous medium containing at least components (a) but derived of at least one of the essential mineral elements.

2. A process according to claim 1, wherein the hydrocarbon feedstock contains at least 85% by weight of linear paraffinic hydrocarbons.

3. A process according to claim 1 wherein the micro-organisms are selected amongst the yeasts, the moulds and the bacteria.

4. A process according to claim 1 wherein the micro-organisms, after being contacted with the non-nutritive aqueous phase are separated and washed, at least once, by means of a washing liquid.

5. A process according to claim 4, wherein the washing liquid is selected from pure water, saline water, a polar solvent, a hydrocarbon solvent and mixtures of said liquids.

6. A process according to claim 5, wherein the polar solvent is a low molecular weight alcohol and the hydrocarbons solvent is a saturated hydrocarbon.

7. A process according to claim 4 wherein the micro-organisms are washed with different washing liquids.

8. A process according to claim 4 wherein the micro-organisms, after at least one washing step, are subjected to such conditions that the cells walls are broken.

9. A process according to claim 8 wherein the breaking of the cells walls is achieved by hydrolysis, autolysis or plasmolysis.

10. A process according to claim 4 wherein the micro-organisms are dried after the washing step.

11. A process according to claim 1 wherein the liberated micro-organisms are recovered from the major part of unconverted hydrocarbons by decantation.

References Cited

UNITED STATES PATENTS 3,264,196   8/1966   Filosa _____ 195—82

JOSEPH M. GOLIAN, Primary Examiner

U.S. Cl. X.R.

99—14; 195—81, 82, 96